US006568184B2

United States Patent
Blackburn et al.

(10) Patent No.: US 6,568,184 B2
(45) Date of Patent: May 27, 2003

(54) PYROTECHNIC ACTUATOR

(75) Inventors: Jeff Blackburn, Lake Orion, MI (US);
Graylon K. Williams, Warren, MI (US); Sean P. Burns, Almont, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/923,119

(22) Filed: Aug. 6, 2001

(65) Prior Publication Data

US 2002/0014076 A1 Feb. 7, 2002

Related U.S. Application Data

(60) Provisional application No. 60/223,059, filed on Aug. 4, 2000.

(51) Int. Cl.⁷ ............................................... F01B 29/08
(52) U.S. Cl. ........................................... 60/636; 60/638
(58) Field of Search ........................... 60/635, 638, 636

(56) References Cited

U.S. PATENT DOCUMENTS

| 2,815,882 A | 12/1957 | Connell | 220/47 |
| 3,234,727 A | 2/1966 | Filer | 60/26.1 |
| 3,893,298 A | * 7/1975 | Williams | 60/635 |
| 3,915,242 A | * 10/1975 | Bell | 173/134 |
| 4,091,621 A | 5/1978 | Patrichi | 60/635 |
| 4,458,921 A | * 7/1984 | Chiba et al. | 280/806 |
| 4,860,698 A | 8/1989 | Patrichi et al. | 123/24 R |
| 5,450,723 A | 9/1995 | Fohl | 60/638 |
| 6,299,211 B1 | * 10/2001 | Wier | 280/806 |

FOREIGN PATENT DOCUMENTS

FR    2772370    12/1997

* cited by examiner

Primary Examiner—Hoang Nguyen
(74) Attorney, Agent, or Firm—Dinnin & Dunn, P.C.

(57) ABSTRACT

A pyrotechnic actuator 10 contains a tapered piston 30 that is first propelled through a chamber 18 upon actuator 10 operation. A narrower portion 38 of the piston 30 initially enters an annular retainer 40 having an annulus 42. The diameter or cross-sectional area of the annulus 42 is about equal to or less than the cross-sectional area of portion 38. As the diameter of the tapered piston 30 increases over the length passing through retainer 40, to a diameter greater than that of annulus 42, the piston 30 is then wedged or fixedly received within the annular retainer 40, thereby preventing retraction of piston 30 once a load is exerted thereon.

5 Claims, 1 Drawing Sheet

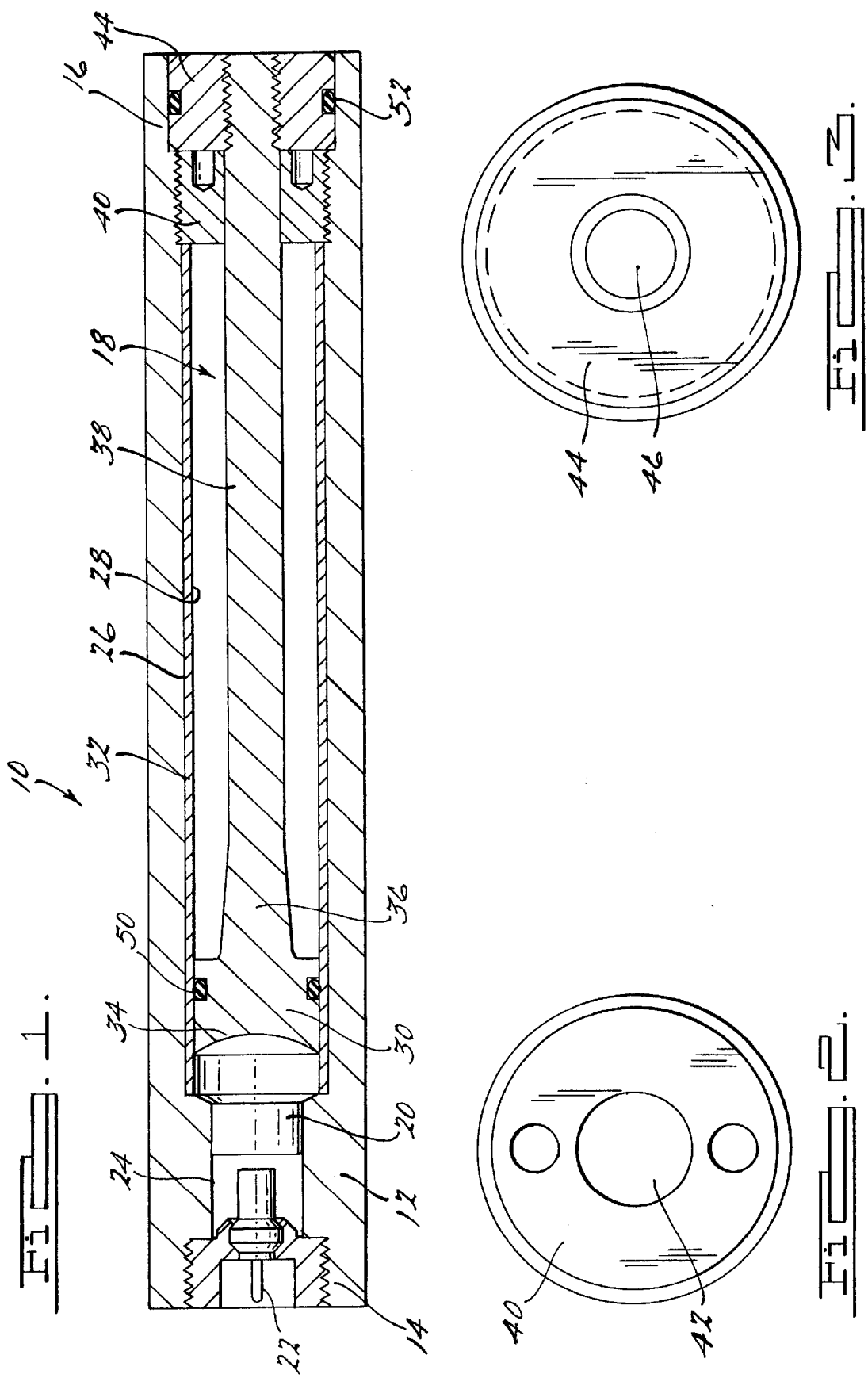

PYROTECHNIC ACTUATOR

CROSS-REFERENCE TO RELATED APPLICATIONS

The present application claims the benefit of U.S. Provisional Application No. 60/223,059 filed on Aug. 4, 2000.

BACKGROUND OF THE INVENTION

The present invention relates to pyrotechnic actuators, and, more specifically, to a pyrotechnic actuator that incorporates a tapered piston thereby simplifying manufacturing of the actuator while resolving performance concerns.

Pyrotechnic actuators are known. Cylinder-piston type actuators of a wide range of dimensions are utilized in a multitude of applications, whereby upon activation of the actuator, a load exerted on the actuator often causes the piston/actuator to retract from its activated position. In hydraulic actuators, the reactive load may be held by blocking return flow of the hydraulic fluid into the cylinder, as by means of an appropriate valve. The same is true of pneumatic actuators. Such actuators, however, are usually heavy and cumbersome and are not suitable for uses wherein a small, lightweight actuator is required. For example, automobile design requirements in certain countries require that pyrotechnic actuators function to raise the vehicle hood immediately upon impact with a pedestrian. By increasing the distance from the engine block to the underside of the hood, the point of impact is effectively softened given the additional space for mechanical deformation of the hood.

One solution to the piston retraction problem is the insertion of a latching mechanism that extends inwardly within the piston cylinder once the piston has been propelled forward upon combustion. Another solution comprises a split ring carried by the piston, expansively engaging the internal wall of the piston cylinder and expandible at the end of the piston stroke thereby holding the piston securely in its projected position. U.S. Pat. No. 4,091,621 is exemplary and is incorporated herein by reference. Although apparently effective, these approaches increase the cost and complexity of manufacturing Another disadvantage in known pyrotechnic actuators is the low thermal stability of many gas generant compositions used therewith. As a result, known pyrotechnic actuators typically function over a small temperature range. Therefore, given the close proximity to the engine block, the gas generant composition employed in the actuator should preferably exhibit a relatively high autoignition temperature and a high thermal stability when cycled from −40° C. to 140° C.

SUMMARY OF THE INVENTION

The aforesaid problems and others are resolved by a pyrotechnic actuator that contains a tapered piston fixedly received by an annular retaining element upon activation of the actuator. In accordance with the present invention, the actuator contains a housing having a piston chamber formed longitudinally therein. A tapered piston is contained within the chamber. A gas generator positioned at a first end of the housing fluidly communicates with the piston upon activation of the actuator. The gas generator includes a pyrotechnic gas generant composition ignitably communicating with or proximate to an igniter also contained therein. Upon activation of the actuator, by an impact or crumple zone sensor for example, the gas generator produces gas and a resultant pressure thereby driving the piston. The tapered piston slidably engages an inner wall of the piston chamber and is propelled toward a second end of the housing. The tapered portion of the piston has a cross-sectional area that changes over its length and therefore is respectively increased in size from a point closer to the second end of the housing to a point closer to the first end of the housing. As a result, upon actuator operation the piston initially freely passes through an annular piston retainer fixed within the second end of the housing. As the cross-sectional area (a diameter for example) of the piston increases by virtue of the tapered piston portion, the piston is fixedly received or wedged within the annular retainer thereby preventing piston retraction when a load is applied to the piston.

At its largest diameter or cross-sectional area, the piston is roughly equivalent to the cross-sectional area of the chamber. Conversely, at its smallest cross-sectional area, the piston is roughly equivalent to or smaller in cross-sectional area as compared to the total area of the retainer annulus. As a consequence, the tapered piston enters and slidably engages the inner wall or annulus of the retainer until the piston is wedged tightly therein as the cross-sectional area or diameter of the piston exceeds that of the retainer annulus. Upon exertion of a load approximately normal to the top surface of the piston, retraction of the piston is thus prevented. The cross-sectional shapes of the chamber, piston, and retainer annulus are preferably the same thereby enhancing sealing and performance of the actuator. For example, if the chamber is formed with a circular cross-section, then the respective cross-sections of the piston and retainer annulus would also preferably have a circular cross-section or diameter.

BRIEF DESCRIPTION OF THE DRAWINGS

FIG. 1 is a diagrammatic elevational view of a pyrotechnic actuator, in accordance with the present invention.

FIG. 2 is a cross-sectional view of the retainer.

FIG. 3 is a cross-sectional view of the piston top.

DESCRIPTION OF THE PREFERRED EMBODIMENT

Referring to the figures, an actuator 10 in accordance with a first embodiment of the invention comprises a housing 12 containing a first end 14 and a second end 16. The housing 12 is preferably die-cast, molded, or otherwise formed from aluminum but may also be formed from other suitable metals or materials such as steel or polymer. A piston chamber 18 is formed or bored longitudinally within the housing extending from the first end 14 to the second end 16. A gas generator 20 is crimped, threadedly received, or otherwise fixed within the housing 12 at the first end 14. An igniter 22 and a pyrotechnic gas generant composition 24 are proximately placed within the generator 20 and ignitably communicate upon actuator 10 operation. A sleeve 26 may coextensively line and reinforce an inner wall 28 of the chamber 18, thereby enhancing the structural integrity of the housing 12 and facilitating the use of aluminum, polymers, or other lighter-weight materials when forming the housing 12. Sleeve 26 is preferably formed from a high strength metal such as steel. If the liner 26 is employed, a piston 30 slidably engages an inner wall 32 of the sleeve 26 upon actuator 10 operation.

The piston 30 contains a first portion 34 having an outer cross-sectional area or diameter roughly equivalent to and slidably engageable with the cross-sectional area of the inner wall 32 of sleeve 26. If the sleeve 26 is not employed, the piston 30 is then slideably engaged with the inner chamber wall 28. In accordance with the present invention, the piston 28 contains a tapered portion 36 proximate to the first portion 34. A longitudinal portion 38 of piston 30 extends from the tapered portion 36 to the second end 16. An annular retainer or annular retaining element 40 is threadedly received or otherwise fixed within the chamber 18 near the second end 16 and retains piston 30 as the cross-sectional area of tapered portion 36 exceeds that of the annulus 42 of retainer 40. The annulus 42 has an inner cross-sectional area or diameter roughly equivalent to or less than that of the longitudinal portion 38. An annular piston top 44 is press-fitted or otherwise releasably fixed within chamber 18 and abuts retainer 40 thereby sealing housing 12 at the second end 16. Piston top 44 contains a second annulus 46 having an inner cross-section or inner diameter roughly equivalent to that of annulus 42. Piston top 44 is threadedly received by the longitudinal portion 38, through annulus 46. Upon actuator operation, the relatively wider cross-section (or diameter) of the piston top 44 provides a greater surface area to support the load exerted thereon.

A first O-ring 50 seals the interface between the portion 34 and the inner wall 28 (or inner wall 32 if sleeve 26 is employed) thereby ensuring a pressure buildup within the chamber 18 once combustion begins. A second O-ring 52 further seals the interface between the piston top 44 and the inner wall. The sleeve 26, the retainer 40, and the piston top 44 are preferably formed from steel although other suitably strong metals, polymers, or materials may also be used.

In further accordance with the present invention, a pyrotechnic gas generant composition may be formed from gas generant compositions as described in U.S. Pat. Nos. 5,035,757 and 5,139,588, herein incorporated by reference. More preferably, the gas generant composition contains 5–55% by weight silicone (e.g. General Electric RTV 615 or equivalent) as a fuel/binder and 45–95% by weight potassium perchlorate as an oxidizer. Compositions formed from silicone have been found to have relatively higher autoignition temperatures and a high thermal stability when cycled from −40 to 140 degrees Celsius. Other known oxidizers may be used in lieu of or in combination with potassium perchlorate in the stated percentage. Additionally, other known gas generant compositions useful in vehicle occupant protection systems for example. Furthermore, the gas generator employed in the present invention may be a hybrid gas generator or any other gas generator known in the art.

When forming gas generant compositions containing silicone and potassium perchlorate, the gas generant constituents are provided in similarly sized granular or smaller particulates. Potassium perchlorate is added to a resin curing agent blend and preferably mixed in a planetary blender, for example, for at least one hour. Silicone is preferably added as a resin that is previously blended with a curing agent. In general, the order in which the constituents are added is not critical so long as they are homogeneously blended. Other known wet and dry blending methods may also be used. Once blending is complete, the gas generant constituents may be extruded or formed into specific shapes such as pellets, sheets, or granules.

In operation, the pyrotechnic actuator 10 is activated upon receipt of a signal generated by an impact, infrared, crumple zone, and/or accelerometer sensor well known in the art. Exemplary sensors include those used within vehicle occupant protection systems. Stated another way, upon vehicle frontal impact the pyrotechnic actuator 10 is activated and the igniter 22 ignites the pyrotechnic gas generant composition 24. Pressure rapidly increases within the chamber 18 thereby driving the piston 30 through the chamber 18 and into the annular retainer 40. The tapered portion 36 of the piston 30 is thereby wedged into the first annulus 42, and thus at a minimum counters the resistance of a load L exerted normal to the piston top 44. The load L represents part or all of the combined weight of a pedestrian and the vehicle hood, for example. Wedging the tapered piston 30 into the annulus 42 of the retainer 40 thus prevents retraction of the piston 30.

Pyrotechnic actuators as described above exhibit simplified manufacturing, reduced costs, and thermally stable gas generant compositions thus broadening the operative temperature range.

It will be understood that the foregoing description of the preferred embodiment of the present invention is for illustrative purposes only, and that the various structural and operational features herein disclosed are susceptible to a number of modifications, none of which departs from the scope of the present invention as defined in the appended claims.

We claim:

1. A pyrotechnic actuator comprising:
    a housing containing a chamber, the chamber comprising a first end, a second end, an inner wall, and a first predetermined cross-sectional area at both the first and second ends and therebetween;
    a gas generator comprising a gas generant composition for producing gases, said generator in fluid communication with said chamber upon actuator operation;
    an annular retainer fixed within the second end of said chamber, said retainer having an annulus having only one relatively smaller second cross-sectional area as compared to the first cross-sectional area of said chamber; and
    a piston slidably engaged with said inner wall of said chamber, the piston having a first end and a second end, and, a tapered portion intermediate of said piston ends, said tapered portion having a minimum cross-sectional area proximate to the second piston end that is less than or about equal to the cross-sectional area of said retainer annulus, and, said tapered portion having a second cross-sectional area greater than said annulus, but not greater than said first predetermined cross-sectional area of said chamber, proximate to the first piston end,
    wherein upon activation of said pyrotechnic actuator, gases produced from the gas generator propel said piston through said chamber from the first end to the second end until said tapered portion is fixedly received within said annular retainer.

2. The pyrotechnic actuator of claim 1 wherein said gas generant composition comprises 5–55% by weight of silicone and 45–95% by weight of potassium perchlorate.

3. The pyrotechnic actuator of claim 1 further comprising a gas generant composition contained within said gas generator, the composition comprising 5–55% by weight of silicone and 45–95% by weight of an oxidizer.

4. A pyrotechnic actuator comprising:
    a housing containing a chamber, the chamber comprising a first end, a second end, an inner wall, and a first predetermined cross-sectional area at both the first and second ends and therebetween;
    a liner covering said inner wall for structural reinforcement of said housing;
    a gas generator for producing gases, said generator in fluid communication with said chamber upon actuator operation; an annular retainer fixed within the second end of said chamber, said retainer having an annulus having only one relatively smaller second cross-sectional area as compared to the first cross-sectional area of said chamber; and a piston slidably engageable with said liner, the piston having a first end and a second end and a tapered portion intermediate of said piston ends, wherein said tapered portion has a cross-sectional area that is initially less than or about equal to the cross-sectional area of said retainer annulus and then increases to a cross-sectional area greater than said annulus, but not greater than said first predetermined cross-sectional area of said chamber, wherein upon activation of said pyrotechnic actuator, gases produced from the gas generator propel said piston through said chamber from the first chamber end to the second chamber end until said tapered portion is fixedly received within said annular retainer.

5. A pyrotechnic actuator comprising:

a housing containing a chamber, the chamber comprising a first end, a second end, an inner wall, and a first predetermined cross-sectional area at both the first and second ends and therebetween;

a gas generator for producing gases, said generator in fluid communication with said chamber upon actuator operation;

an annular retainer fixed within the second end of said chamber, said retainer having an annulus having only one relatively smaller second cross-sectional area as compared to the first cross-sectional area of said chamber; and a piston slidably engageable with the inner wall of said chamber, the piston comprising a first end and a second end corresponding to the first and second ends of said chamber and the piston further comprising a cross-sectional area that is tapered and reduced from said first piston end to said second piston end but is not greater than said first predetermined cross-sectional area of said chamber, wherein the cross-sectional area of said piston decreases from a size greater than said retainer annulus to a size less than said retainer annulus whereby upon activation of the pyrotechnic actuator, gas produced from the gas generator drives the piston through the chamber until the piston is fixedly received within the annular retainer.

* * * * *